(12) United States Patent
Deyo

(10) Patent No.: US 8,566,262 B2
(45) Date of Patent: Oct. 22, 2013

(54) TECHNIQUES TO FILTER MEDIA CONTENT BASED ON ENTITY REPUTATION

(75) Inventor: Roderic C. Deyo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/474,760

(22) Filed: May 18, 2012

(65) Prior Publication Data

US 2012/0278264 A1 Nov. 1, 2012

Related U.S. Application Data

(63) Continuation of application No. 12/098,454, filed on Apr. 7, 2008, now Pat. No. 8,200,587.

(51) Int. Cl.
*G06F 15/18* (2006.01)

(52) U.S. Cl.
USPC .......................................................... 706/12

(58) Field of Classification Search
USPC ................................................ 706/12; 705/1
See application file for complete search history.

(56) References Cited

U.S. PATENT DOCUMENTS

| | | | |
|---|---|---|---|
| 6,266,664 | B1 | 7/2001 | Russell-Falla et al. |
| 2002/0103801 | A1 | 8/2002 | Lyons |
| 2002/0133365 | A1 | 9/2002 | Grey et al. |
| 2005/0204005 | A1 | 9/2005 | Purcell et al. |
| 2006/0009994 | A1 | 1/2006 | Hogg et al. |
| 2006/0212931 | A1 | 9/2006 | Shull et al. |
| 2007/0162587 | A1 | 7/2007 | Lund et al. |
| 2007/0192169 | A1 | 8/2007 | Herbrich et al. |
| 2007/0192855 | A1 | 8/2007 | Hulten et al. |
| 2007/0239684 | A1 | 10/2007 | Anderson et al. |

FOREIGN PATENT DOCUMENTS

WO 2007076297 A2 7/2007

OTHER PUBLICATIONS

Chopra, et al., "A Source Address Reputation System to Combating Child Pornography at the Network Level", Proc. of the IADIS International Conference on Applied Computing, San Sebastian, Spain, 2006, pp. 472-477.

Whitby, et al., "Filtering Out Unfair Ratings in Bayesian Reputation Systems", in The Icfain Journal of Management Research, vol. 4, No. 2, Dated: Feb. 2005, pp. 48-64.

Fan, et al., "Evaluation and Design of Online Cooperative Feedback Mechanisms for Reputation Management", IEEE Transactions on Knowledge and Data Engineering, vol. 17, Issue 2 (Feb. 2005), Year of Publication: 2005, pp. 244-254.

(Continued)

*Primary Examiner* — Jeffrey A Gaffin
*Assistant Examiner* — Ola Olude Afolabi

(57) ABSTRACT

Techniques to filter media content based on entity reputation are described. An apparatus may comprise a reputation subsystem that manages an entity reputation score for an entity. The reputation subsystem comprising a reputation manager component and a reputation input/output (I/O) component. The reputation manager component may include a data collection module that collects reputation information for an entity from a selected set of multiple reputation sources. The reputation manager component may also comprise a feature manager module, communicatively coupled to the data collection module, that extracts a selected set of reputation features from the reputation information. The reputation manager component may further comprise a reputation scoring module, communicatively coupled to the feature manager module, that generates an entity reputation score based on the reputation features using a supervised or unsupervised machine learning algorithm. Other embodiments are described and claimed.

18 Claims, 6 Drawing Sheets

(56) References Cited

OTHER PUBLICATIONS

Resnick, et al., "Reputation Systems: Facilitating Trust in Internet Interactions", in Communications of the ACM, vol. 43, Issue 12, Dated: Dec. 2000, pp. 45-48.

Lee, et al. "Neural Networks for Web Content Filtering", Intelligent Systems, IEEE, vol. 17, No. 5, Dated: Sep./Oct. 2002, pp. 48-57. DOI: 10.1109/MIS.2002.1039832, URL: http://ieeexplore.ieee.org/stamp/stamp.jsp?tp=&arnumber=1039832&isnumber=22293.

400

```
COLLECT REPUTATION INFORMATION FOR AN ENTITY
FROM A SELECTED SET OF MULTIPLE REPUTATION
SOURCES
402
          │
EXTRACT A SET OF REPUTATION FEATURES FROM THE
REPUTATION INFORMATION
404
          │
GENERATE AN ENTITY REPUTATION SCORE BASED ON THE
REPUTATION FEATURES USING A MACHINE LEARNING
ALGORITHM
406
```

STORAGE MEDIUM 602

LOGIC 604

*FIG. 6*

TECHNIQUES TO FILTER MEDIA CONTENT BASED ON ENTITY REPUTATION

CROSS-REFERENCE OF RELATED APPLICATIONS

This application claims the benefit of, and priority to, previously filed U.S. patent application Ser. No. 12/098,454 entitled "Techniques To Filter Media Content Based on Entity Reputation" filed on Apr. 7, 2008, the subject matter of which is hereby incorporated by reference in its entirety.

BACKGROUND

While the Internet offers access to a wealth of educational, entertainment, and similar materials of interest to a wide variety of people, it is also replete with information perceived as offensive by some people. Many websites include content that is created by users of the website. When a system that accepts content from users, the appropriateness or offensiveness of the user provided content may become a difficult problem to address.

Requiring that all content submitted by users be reviewed by the hosting organization places a limit on the amount of content that can make it to the site, since it depends upon the website organization's internal resources available to review that material. This may be further compounded when multiple languages are taken into consideration. Furthermore, a malicious user could post hundreds or thousands of instances of objectionable content all requiring individual review or filtering.

On the other hand, setting the bar too high may unnecessarily limit user provided content to a website. Typically in these systems, a majority of content comes from a vast minority of contributors who are active participants on the website. Hence, in order to accept a lot of content, it may benefit site architects to design a system in such a way that content from these high-value contributors can easily find its way into the default experience.

It is with respect to these and other considerations that the present improvements are needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to filter media content based on entity reputation. Some embodiments are particularly directed to techniques to generate an entity reputation score using various reputation scoring algorithms and a diverse reputation feature set derived from various reputation sources. The entity reputation score may be used for various use scenarios, including filtering media content submitted by the entity for storage by a network-accessible storage device.

In one embodiment, for example, an apparatus may comprise a reputation service node having, among other elements, a reputation subsystem operative to manage an entity reputation score for an entity. The reputation subsystem comprising a reputation manager component and a reputation input/output (I/O) component. The reputation manager component may comprise, among other elements, a data collection module operative to collect reputation information for an entity from a selected set of multiple reputation sources. The reputation manager component may also comprise a feature manager module communicatively coupled to the data collection module, the feature manager module operative to extract a selected set of reputation features from the reputation information. The reputation manager component may further comprise a reputation scoring module communicatively coupled to the feature manager module, the reputation scoring module operative to generate an entity reputation score based on the reputation features using a supervised or unsupervised machine learning algorithm. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 4 illustrates an embodiment of a logic flow.
FIG. 6 illustrates an embodiment of an article.

DETAILED DESCRIPTION

Figure 1:
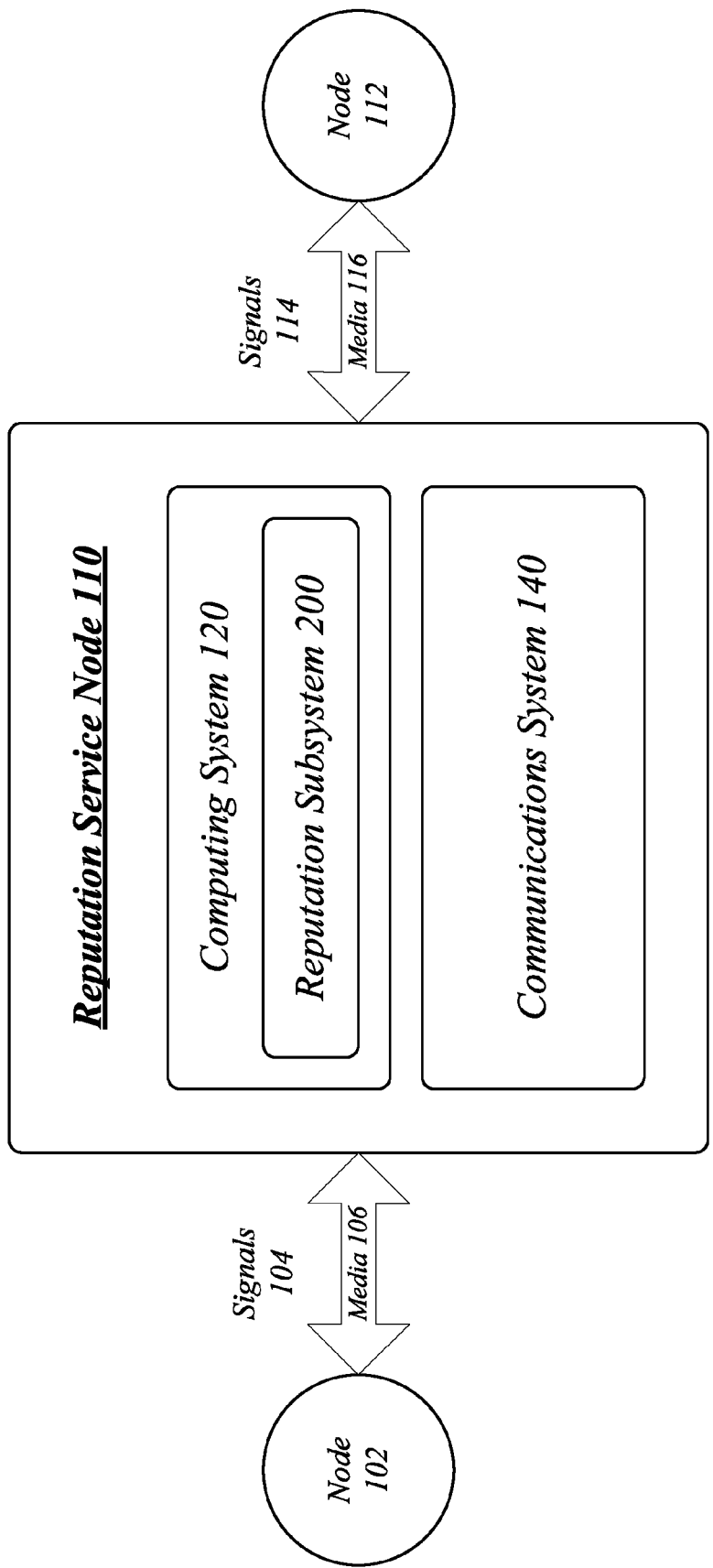
FIG. 1 illustrates an embodiment of a first network.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments are directed to filter media content based on reputation information for an entity. More particularly, various embodiments are directed to techniques for improving automated filtering of submitted media content using machine learning algorithms to score entity reputation. The entity reputation scores may be used as a proxy or inference to identify trusted and non-trusted entities. For example, some embodiments may utilize supervised or unsupervised machine learning algorithms and diverse feature data to draw inferences regarding entity identity, entity relationships and entity reputation. Reputation is an important factor in establishing trust relationships between users and communities, with the end goal of driving community participation and growth while helping ensure safety and reliability. Entity reputation may be used to represent such entity characteristics as trustworthiness, authority, relevance, activity and so forth. The entity reputation may be implemented for various use scenarios, including generating entity reputation scores suitable for use by proactive filtering techniques designed to filter media content submitted by an entity for storage by a network-accessible data store, such as a data store for a digital online community, and public or private viewing of the media content by members of the digital online community. In this manner, the amount of potentially inappropriate, offensive or illegal media content exposed to members of the digital online community may be filtered out and reduced, thereby enhancing the brand, reputation and experience for the digital online community.

A hosting organization for a website for a digital online community is typically concerned with hosting potentially offensive media content submitted by an entity, such as a content producer, author or submitter (collectively referred to herein as a "content submitter"). Conventional techniques attempt to pass the media content through automated filters tuned to detect inappropriate, offensive or illegal content. Once the media content passes the automated filters, however, offensive media content may only be identified in a reactive mode, that is, offensive content is removed after it is reported offensive by members of the community. Because of the inevitable false-negative errors associated with automated proactive filtering techniques, offensive media content will invariably be uploaded to the website and thereby risk discovery by members of the community. This represents a significant business risk since it damages user confidence in the hosting organization, and potentially degrades the brand value and reputation of the hosting organization. Furthermore, reactive removal of reported offensive media content takes significant amounts of time thereby increasing the risk of potential damage. The use of human graders to examine and pass submitted content before public viewing to implement such reactive removal is labor intensive, expensive and difficult to scale. Consequently, there is a substantial need for alternative techniques to conventional error-prone filtering or simple reactive removal of offensive content. Accordingly, the embodiments implement various techniques to filter submission of media content individually in a proactive mode, and further, utilize the inferred behavior of content submitters to determine a reputation for the content submitter that is both reliable and durable.

In one embodiment, an apparatus such as a reputation service node may generate an entity reputation score for use in filtering media content submitted by an entity to a network device, such as a hosted website for a digital online community. Some embodiments may utilize supervised or unsupervised learning algorithms and diverse feature data to draw inferences regarding entity identity, entity relationships and entity reputation. The diverse feature data may include community encounters and feedback, content tags, content ratings, and so forth. The contextual community feedback may also be used as a mechanism of providing labeled data for supervised training of the classification and regression algorithms. The diverse feature data may be part of an intermediate indexed feature store designed to accelerate contextual scoring of entity reputation. For example, a reputation subsystem may use an intermediate, indexed, pre-computed, and cached feature store to accelerate scoring and facilitate dynamic algorithm tuning. Primary and derived data would be transformed into indexed features for use in the scoring algorithms. The use of indexed features may facilitate implementation of extensible, pluggable algorithms. A feature mask may be used to retrieve the desired pre-computed features for a given reputation scoring algorithm.

The entity reputation score may be determined, calculate or inferred using one or more reputation scoring algorithms. In some embodiments, for example, the reputation scoring algorithms may be designed to score specialized entity relations, such as distinguished uni-directional encounters and bi-directional transactions. Further, inductive prediction algorithms may be used for contextual encounter-based reputation scoring. The reputation scoring algorithms may use feedback from encounters to predict whether the next random community entity will have a positive or negative experience.

FIG. 1 illustrates a block diagram for a network 100. The network 100 may comprise various elements designed for implementation by a single entity environment or a multiple entity distributed environment. Each element may be implemented as a hardware element, software element, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the network 100 may comprise, among other elements, multiple nodes 102, 110 and 112. A node may generally comprise any electronic device designed for managing, processing or communicating information in the network 100. Examples for a node may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the network 100 as shown in FIG. 1 has a limited number of nodes in a certain topology, it may be appreciated that the network 100 may include more or less nodes in alternate topologies as desired for a given implementation.

The nodes 102, 112 may be communicatively coupled to the node 110 via respective communications media 106, 116. The nodes 102, 110, 112 may coordinate operations between each other. The coordination may involve the uni-directional or bi-directional exchange of information. For instance, the nodes 102, 112 may communicate information with the node 110 in the form of respective signals 104, 114 communicated over the respective communications media 106, 116. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the node 110 may be implemented as a reputation service node 110. The reputation service node 110 may comprise any logical or physical entity that is arranged to receive, manage, process or send reputation information between the nodes 102, 112. In some embodiments, the reputation service node 110 may implement supervised or unsupervised machined learning algorithms and diverse feature data to draw inferences regarding entity identity, entity relationships and entity reputation. The diverse feature data may include community encounters and feedback, content tags, content ratings, and so forth. For example, the reputation service node 110 may implement various reputation scoring techniques to generate, update and manage entity reputation scores for various entities, which may be used as a basis for filtering media content submitted by the various entities.

In some embodiments, the reputation service node 110 may be used to implement a network service or web service that collects a diverse set of reputation information from various reputation sources, processes the reputation information to generate entity reputation scores, and return the entity reputation scores to requestors for use in a number of use scenarios, including filtering media content to determine whether to allow a content submitter to submit content to a digital online community.

A digital online community may refer to a set or collection of entities having common interests, viewpoints, etiology, or other shared elements in a network environment. Examples of digital online communities may include, such as a social network, discussions/messaging (e.g., threaded discussions with community feedback), question and answer communities, general discussion message boards, classified/auction communities (e.g., buyer/seller transaction and rating model), blogs and personal sites, real-time communication communities (e.g., instant messaging, chat, email, etc.), game communities, product review communities, ecommerce communities, and so forth. The embodiments are not limited in this context.

Among other elements, the reputation service node 110 may generally comprise a computing system 120 and/or a communications system 140. The computing system 120 includes various common computing elements, such as one or more processors, co-processors, memory units, chipsets, controllers, peripherals, interfaces, oscillators, timing devices, video cards, audio cards, multimedia input/output (I/O) components, and so forth. The communications system 140 includes various common communications elements, such as a transmitter, receiver, transceiver, radio, network interface, baseband processor, antenna, amplifiers, filters, and so forth. In one embodiment, for example, the reputation service node 110 may be implemented using a computing and communications architecture as described with reference to FIG. 5.

The computing system 120 and/or the communications system 140 may include a reputation subsystem 200. The reputation subsystem 200 is designed to manage various entity reputation scores for various entities. An entity may comprise, for example, a user, an operator, a content submitter, a content producer, a content author, a reputation source, a web service requestor, an organization, an enterprise, a user agent, an object, a node, a device, a system, a subsystem, and so forth. The reputation subsystem 200 may implement the various reputation scoring techniques. In one embodiment, for example, the reputation subsystem 200 may receive the signals 104 representing reputation information from one or more source nodes 102 over the communications media 106, process the signals 104 to generate the entity reputation scores, and send the signals 114 representing the entity reputation scores to one or more destination nodes 112 and/or back to the source node 102. Additional details for the reputation subsystem 200 may be described with reference to FIG. 2.

Figure 2:
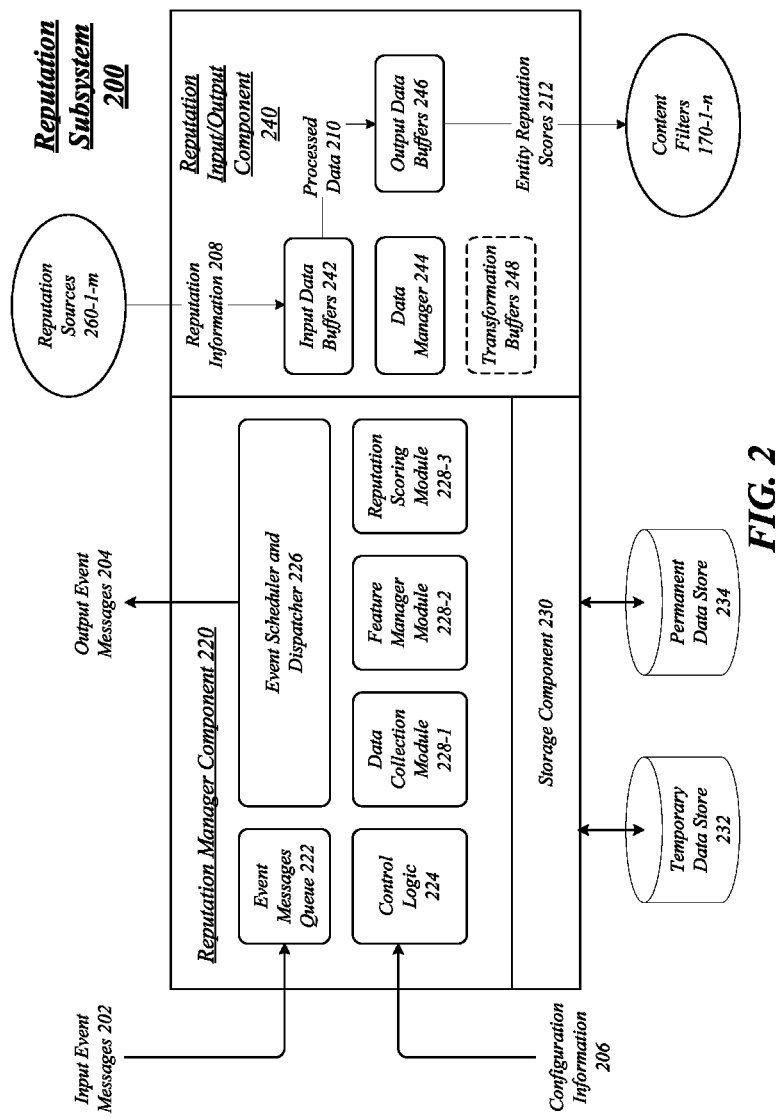
FIG. 2 illustrates an embodiment of a reputation subsystem.

FIG. 2 illustrates a more detailed block diagram for the reputation subsystem 200. The reputation subsystem 200 may comprise multiple components and/or modules. In the illustrated embodiment shown in FIG. 2, the reputation subsystem 200 may include a reputation manager component 220, a storage component 230, and a reputation input/output (I/O) component 240. The components and/or modules may be implemented using hardware elements, software elements, or a combination of hardware elements and software elements. Although the reputation subsystem 200 as shown in FIG. 2 has a limited number of elements in a certain topology, it may be appreciated that the reputation subsystem 200 may include more or less elements in alternate topologies as desired for a given implementation.

The reputation manager component 220 may be arranged to receive various input event messages 202 at an event message queue 222. Examples of an event message 202 may comprise a request for an entity reputation score for a given entity, permission to accept media content from a content submitter, and so forth. The event message queue 222 may comprise one or more queues for handling event messages. In one embodiment, for example, the event message queue 222 may handle event messages with distinct priorities.

The reputation manager component 220 may include control logic 224. The control logic 224 may be arranged to control operations of the reputation manager component 220 based on configuration information 206. For example, the control logic 224 may implement an algorithm, logic flow or a state machine to perform various operations on reputation data 208 in response to the various input event messages 202. The control logic 224 may process the reputation data 208 based on the configuration information 206 to form processed data 210. An example of processed data 210 may include various reputation features derived from the reputation data 208, or entity reputation scores 212 derived from the reputation features. The control logic 224 may also generate various output event messages 204, and send the output event messages 204 to an event scheduler and dispatcher 226.

The reputation manager component 220 may include an event scheduler and dispatcher 226. The event scheduler and dispatcher 226 may be arranged to initiate events to other external entities, and dispatches internal events and messages within the reputation manager component 220. The event scheduler and dispatcher 226 may send various output event messages 204 responsive to the input event messages 202 to other systems, subsystems, components or modules for the systems 120, 140, the reputation service node 110, and/or the network 100. For example, the event scheduler and dispatcher 226 may send notifications and/or various entity reputation scores 212 in the form of the output event messages 204 in response to requests received via the input event messages 202. Additionally or alternatively, the event scheduler and dispatcher 226 may send internal messages to the data manager 244 to send the entity reputation scores 212 to a requestor, such as network devices utilizing various content filters 270-1-$n$.

In one embodiment, the reputation subsystem 200 may include the storage component 230. The storage component 230 may include one or more data stores and logic to manage storage operations for the reputation manager component 220. The storage component 230 may store temporary or non-transacted information used by the reputation manager component 220 in a temporary data store 232. For example, the temporary or non-transacted information may be stored as extensible markup language (XML), binary files, or some other format in the temporary data store 232. The storage component 230 may store persistent or transacted information used by the reputation manager component 220 in a permanent data store 234. The data stores 232, 234 may comprise individual data stores, respectively, or multiple data stores comprising part of a larger data store array, such as a storage area network (SAN). Furthermore, the storage component 230 and the data stores 232, 234 may implement the appropriate data buffering and caching techniques and structures if needed to meet system latency and capacity parameters. The storage component 230 also manages operations for logging and auditing storage.

In one embodiment, the reputation subsystem 200 may include the reputation I/O component 240. The reputation I/O component 240 may be arranged with buffers and logic to manage transport and I/O operations in moving information throughout the reputation subsystem 200, the reputation service node 110, or the network 100. For example, the reputation I/O component 240 may include one or more input data buffers 242 to receive and store reputation data 208 from an input subsystem, such as one or more reputation sources 260-1-$m$. One or more modules of the reputation manager reputation manager component 220 may process the reputation data 208 to form processed data 210, and send it to one or more output data buffers 246. The output data buffers 246 may be arranged to store and send the entity reputation scores 212 to an output subsystem, such as one or more content filters 270-1-$n$. Optionally, the reputation I/O component 240 may implement one or more transformation buffers 248 to transform the reputation data 208 received from the reputation sources 260-1-$m$ and/or the processed data 210 from one format, data schema or protocol, to alternate formats, data schemas, or protocols appropriate for the content filters 270-1-$n$.

The reputation I/O component 240 may be arranged to communicate the reputation information 208 and the entity reputation scores 212 between the respective reputation sources 260-1-$m$ and the content filters 270-1-$n$ using any number of common communications or bus protocols. In one embodiment, for example, the reputation I/O component 240 may implement a transacted message passing architecture to transmit and handle prioritized events from various internal and external sources.

In one embodiment, the reputation I/O component 240 may include a data manager 244. The data manager 244 may generally implement logic and network interfaces (e.g., web service interfaces) to control and manage data collection services and data distribution services for the reputation I/O component 240. For example, the data manager 244 may manage, store and update primary and derived data received from the reputation sources 260-1-$m$. The data manager 244 creates, manages and stores internally generated derived data from the primary data received from the reputation sources 260-1-$m$. For example, the data manager 244 manages and stores entity relation graphs and metadata. The data manager 244 supports both transacted data using various database techniques and the permanent data store 234, and temporary or non-transacted data using files stored by the temporary data store 232.

The reputation manager component 220 may further comprise various reputation operational modules 228-1-$p$ designed to implement corresponding sets of operations for communicating, processing and otherwise managing reputation information 208, intermediate data, feature data, and entity reputation scores 212 derived from the reputation information 208.

The reputation manager component 220 may include a data collection module 228-1. The data collection module 228-1 may be arranged to interoperate with the data manager 244 to collect reputation information 208 for an entity from a selected set of multiple reputation sources 260-1-$m$. The reputation sources 260-1-$m$ may comprise any network-accessible entity having relevant information for an entity. Examples of the reputation sources 260-1-$m$ include various digital online communities, network devices, network data stores, network services, network service providers, web services, web service providers, governmental agencies, private organizations, public organizations, businesses, enterprises, public directories, private directories, educational institutions, location devices, global positioning devices, data networks, cellular networks, telephone networks, and so forth. The data collection module 228-1 may implement various web services (e.g., SOAP) for collecting the reputation information 208 from the selected reputation sources 260-1-$m$ based on a unique user identifier, such as a MICROSOFT® PASSPORT user identifier (PUID). The data collection module 228-1 may be designed to support both push and pull data models.

The data collection module 228-1 typically includes various network interfaces (e.g., SOAP) for pulling reputation information 208 from the various reputation sources 260-1-$m$ and pushing reputation scores 212 to various requestors, such as the content filters 270-1-$n$. The reputation I/O component 240 may implement the appropriate data buffering and caching needed to support system latency and capacity requirements.

The reputation manager component 220 may also comprise a feature manager module 228-2 communicatively coupled to the data collection module 228-1. The feature manager module 228-2 may be arranged to extract a selected set of reputation features from the reputation information 208 for use by the various machine learning reputation scoring algorithms. Both the data transformations as well as the reputation scoring algorithms are pluggable to handle new data and classification algorithms. The feature manager 228-2 creates various indexed reputation features suitable for the various reputation scoring algorithms used to generate the entity reputation scores 212. Examples of reputation features may include without limitation rating encounters, buyer/seller transactions ratings, discussion board community ratings of posts, social networks of buddies who have rated an entity, total entity activity counts, time series of entity activity counts, user-user relationships, user-object relationships, user social network sub-graphs and associated metadata, and so forth. For purposes of efficiency, flexibility, or extensibility, the reputation scoring algorithms may use indexed features rather than the hierarchical, strongly typed and transacted primary and derived data stored by the data manager 244. The feature manager module 228-2 may store the reputation features via the data stores 232, 234 managed by the storage component 230.

The feature manager module 228-2 may be arranged to create certain reputation features needed for a reputation scoring algorithm by processing the reputation information 208. The resulting reputation features may be persistently stored by the storage component 230 for retrieval and use by the reputation scoring module 228-3. The reputation features typically has some or all of the following characteristics:

reputation features may or may not be combined, an example of the latter case including when features are used in machine learning algorithms whose output is a feature for another machine learning algorithm;

reputation features are pre-computed from the primary and derived data and stored until updated;

fixed and structured patterns of direct read operations from the reputation scoring module 228-3 and corresponding reputation scoring algorithms;

relatively rare write operations as compared to reads done periodically to update feature data from the primary and derived data stored by the data manager 244;

large reputation feature sets for needed scoring; and reputation features are typically localized within a single data center hosting the data manager 244 and storage, although in some cases, the reputation features may be distributed when the data set becomes very large.

To service some or all of these characteristics, the data manager 244 and/or the storage component 230 may use a de-normalized SQL database optimized for reads. Dirty reads may be acceptable for some types of reputation features. Local database partitioning can be used to support scale-up as reputation feature data sets increase.

The reputation manager component 220 may further comprise a reputation scoring module 228-3 communicatively coupled to the feature manager module 228-2. The reputation scoring module 228-3 operative to generate an entity reputation score 212 based on the reputation features using a supervised or unsupervised machine learning algorithm. The reputation scoring module 228-3 implements machine learning and other algorithms that use the reputation features and other metadata information for scoring various entities, such as users, agents, and objects. The reputation scoring module 228-3 may further implement various web services for exporting entity reputation scores 212 based on abstracted forms of identity for entities.

The reputation scoring module 228-3 may implement one or more reputation scoring algorithms to generate entity reputation scores. Various reputation scoring algorithms may be used to generate intermediate entity reputation scores that are used to collectively generate a final entity reputation score. A given set of reputation scoring algorithms used to generate a particular entity reputation score 212 may be configurable using the configuration information 206. The reputation scoring algorithms may generate and compile different reputation measures or scores based on different reputation features. The reputation scores may be generally categorized into proactive and reactive scores.

The reputation scoring module 228-3 may generate proactive scores using reputation features derived from the reputation information 208 received from the reputation sources 260-1-$m$. Proactive scores may refer to those reputation measures that are predictive in nature, such as determining whether a next random content viewer would find media content from a content submitter offensive or inoffensive. Examples of proactive scores may include without limitation copyright violation scores, image classification scores, virus and signature-based malware filter scores, and so forth.

The reputation scoring module 228-3 may also generate reactive scores using reputation features derived from the reputation information 208 received from the reputation sources 260-1-$m$. Reactive scores may refer to those reputation measures that are reactive in nature, such as measuring reaction to media content already submitted by a given content submitter. Examples for reactive scores may include moderation scores, reported offensive content scores, reported copyright violation scores, abuse reporting scores, and so forth.

Both the proactive and reactive scores may use historical reputation information 208 for an entity, including previous submissions, activities, encounters and relationships. The reputation scoring module 228-3 may implement various community rating scoring features. For example, authenticated users can rate media content (e.g., videos) they view. Current ratings from all authenticated users may be aggregated and an average rating calculated. This rating will be displayed with the user along with the number of ratings on which it is based. The reputation scoring module 228-3 may also implement various activity scoring features. For example, activity counts and date/times may be collected and accumulated for producer activity, creating media content, annotating media content, community involvement as moderator, and so forth. In another example, activity counts and date/times may be collected and accumulated for community activity, such as rating media content, commenting on existing media content, asking questions that other users find meaningful, reporting offensive media content. Entity activity may be derived from this information, including a time period over which an entity has been submitting videos (e.g., days since first submitted video), time period over which an entity has been participating in the community (e.g., days since first submitted a rating, comment, question, etc.), total number of media content submissions, total and average number tags added to media content, total number of ratings they have submitted, total number of comments they have submitted, total number of questions they have submitted, total number of accurate and inaccurate reports they have submitted, and so forth.

In one embodiment, for example, the reputation scoring module 228-3 may implement a reputation scoring algorithm for processing reputation features representing a contextual relation between entities that are members of digital online communities, such as a social network. The contextual relations may include encounters or transactions between members of the digital online community. For example, as part of scoring entities based on community feedback (e.g., threaded support discussions), the reputation scoring module 228-3 treats reputation as a probability estimate based on past community ratings of previous user posts. The probability estimate may represent an estimate for the probability of whether the next rating of an entity's next post will be positive. This approach generalizes to reputation, authority, or relevance being scored as the probability of the next random link in the weighted network graph having a positive value based on the existence of previous link weights, where the weights for the relation have been assigned from the community, link nodes, or external sources. Context is incorporated as a distinguished set of nodes and links forming a sub-graph of the graph of existing and possible nodes and links. Pre-computed graph and meta-data features can be used as part of contextual scoring by masking off the context sub-graph.

Certain reputation scoring algorithms may also take into account the timeliness of the individual contextual uni-directional encounter and bi-directional transaction relations. In addition, relations may be evaluated and scored based on such reputation information 208 as community abuse reports and social network membership. For example, whether a community rater was on the entity's buddy list or was on the buddy list of someone on their buddy list.

More particularly, the concept of reputation as trustworthiness is modeled on predicting the rating by participants and the community of various interactions ("relations") between entities (e.g., users, agents, and objects) such as encounters and transactions performed within a specified context such as a digital online community. For example, in a forum such as "Community Assistance" a user typically posts a question, members of the community answer the question, and the poster and community rates the answers. In this example, the community relations are between the poster, answers, and raters.

To make this model more precise, fix a set $\Omega$ of entities (e.g., users, agents, and objects) from which reputation is to be determined. Let P be an initial set of relations between the members of $\Omega$. Relations are directed and can be represented as ordered pairs (A, B), where A and B are elements of $\Omega$. The set $\Omega$ and relations P among the set members are represented by a directed graph G, having as its nodes the elements of $\Omega$ and as its directed edges the elements of P. Let $\Omega_{max}$ be a maximal set of entities, such as all members of MICROSOFT® WINDOWS® LIVE HOTMAIL®. Let $P_{max}$ be the maximal set of relations between members of $\Omega_{max}$. Assume all graphs are a sub-graph of a fixed $G_{max}$.

A context C is defined as a sub-graph of the maximal graph $G_{max}$, e.g., subsets $\Omega'$ of $\Omega_{max}$ and P' of $P_{max}$ such that every node representing ordered pairs in P' are elements of $\Omega'$. For example, the members of the Hotmail Community Self-help who post questions, answer questions, and rate answers as relations are a context for all Microsoft Windows Live Hotmail user self-help communities and questions, answers, and ratings.

In general, a graph G evolves over time, with new relations being formed and old relations being broken or new nodes being added or removed. Denote the time-dependent graph by $G_t$, where t is the time. The corresponding time-dependent set of graph nodes and relations are denoted by $\Omega_t$ and $P_t$, respectively. In the same way, sub-graph contexts of $G_t$ are then time dependent and denoted by $C_t$.

An encounter is a directed relation between two elements A and B of $\Omega$ that involves A directly or indirectly judging or rating B. More formally, let A be an entity belonging to a context C of $\Omega$ and let B be another entity also belonging to C, but where B can have an opinion or produce a rating about other elements of $\Omega$, such as A. Define "B has an encounter with A within the context C" when B has an interaction with A about which B can leave feedback or ratings. For example, when A is a posting object in a threaded discussion context, it means "B reads A and can rate it as positive or negative." An encounter between B and A is denoted E(B,A).

Connected chains of encounters may or may not always be separately managed, stored, or scored. For example if A submits a post C and B rates the post, it would be reasonable to generate both E(C,A), representing user A submits post C, and E(C, B), representing user B rates post C, but eliminate the shared node C and just use E(A,B) to represent the relation "B rates a post submitted by user A." This type of ambiguity is rife when dealing with more or less unbounded relational types. In one embodiment, the latter form of encounter between two users is used, and the intermediate object C that connects the two more specific relations is eliminated. The community feedback is typically binary, where a user can report an encounter only as "positive" or "negative."

The reputation R(A|C) of an entity of $\Omega$ is the conditional probability that a random user, agent, or object B who has an "encounter" with A within context C and gives feedback on the encounter, will report a positive experience. Note that the context C should be thought of as a random vector variable on the graph $G_{max}$, A is a random choice of B and an encounter relation E(B,A) in $G_{max}$, and R(A|C) is the conditional probability that the encounter will lead to a positive rating.

This definition predicts whether a user B will have a "good" experience with A, where "good" is defined as being whatever the user means by "positive" when they give feedback in that context. Note this definition is context dependent. This definition is also in agreement with a definition of reputation as "the probability of whether or not an agent can trust that their expectations will be met." This definition may not be suitable, however, for some forms of reputation where the desired reputation is an expected value rather than probability of an outcome. If needed, the expected value can be calculated as the expectation over all encounters E(B,A).

The reputation scoring module 228-3 may implement a reputation scoring algorithm to use the community reputation information 208 to generate an entity reputation score 212. Using the above-defined community model, for example, the reputation scoring algorithm may perform activity scoring based on keeping track of events, such as posts, ratings, views, etc., and perform accounting and rollup operations to generate the final entity reputation score 212.

In some cases, the reputation scoring module 228-3 may implement reputation scoring algorithms as various machine learning algorithms to enhance reputation scoring operations. As a broad subfield of artificial intelligence, machine learning is concerned with the design and development of algorithms and techniques that allow computers to "learn." At a general level, there are two types of learning, including inductive and deductive. Inductive machine learning methods extract rules and patterns out of massive data sets.

Machine learning algorithms are typically organized into a taxonomy based on the desired outcome of the algorithm. Common algorithm types include:

1. Supervised Learning—In supervised machine learning, the algorithm generates a function that maps inputs to desired outputs. One standard formulation of the supervised learning task is the classification problem. The learner approximates the behavior of a function which maps a vector into one of several classes by looking at several input-output examples of the function. Examples of supervised machine learning algorithms may include Naïve Bayes, Decision Trees, Boosted Decision Trees, Logistical Regression, Support Vector Machines, Neural Nets, and so forth.
2. Unsupervised Learning—In unsupervised machine learning, an agent models a set of inputs. Labeled examples are not available. Examples of unsupervised machine learning techniques include clustering via indexed keyword meta-data or social network link distance. Examples of unsupervised machine learning algorithms may include K-mean Clusters, Nearest Neighbor Rules, Latent Semantic Analysis, and so forth.
3. Semi-Supervised Learning—Semi-supervised machine learning combines both labeled and unlabeled examples to generate an appropriate function or classifier.
4. Reinforcement Learning—Reinforcement machine learning is where the algorithm learns a policy of how to act given an observation of the world. Every action has some impact in the environment, and the environment provides feedback that guides the reinforcement learning algorithm.
5. Transduction Learning—Similar to supervised learning, transduction machine learning does not explicitly construct a function. Rather, transduction machine learning tries to predict new outputs based on training inputs, training outputs, and test inputs which are available while training.
6. Learning To Learn—Learning to learn machine algorithms learn its own inductive bias based on previous experience.

In one embodiment, for example, the reputation scoring module 228-3 may implement a reputation scoring algorithm in the form of an unsupervised machine learning algorithm. Unsupervised machine learning techniques infer new relations, such as the similarity of social and economic interests, or to disambiguate multiple user pseudonyms. In the context of using community reputation information 208, examples of unsupervised machine learning techniques include clustering via indexed keyword meta-data or social network link distance. The embodiments, however, are not limited to this particular example.

Figure 3:
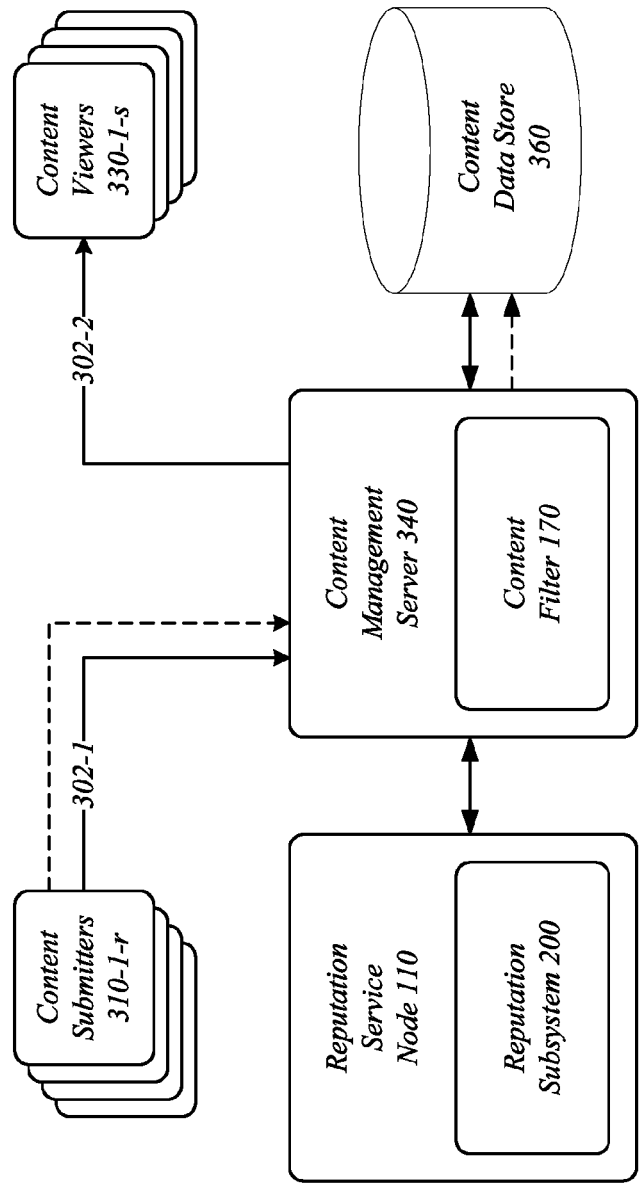
FIG. 3 illustrates an embodiment of a second network.

FIG. 3 illustrates an embodiment of a network 300. The network 300 may be similar to the network 100 as described with reference to FIG. 1, with additional elements. The network 300 may illustrate where example embodiments may be implemented. The network 300 includes the reputation service node 110, a content management server 340, and a content data store 360. One or more content submitters 310-1-r and content viewers 330-1-s may be communicatively coupled to the content management server 340 and the content data store 360 via various communications links 302-1-t.

The content management server 340 may comprise a server designed to manage and control access to the media content stored by the content data store 360. The content management server 340 may further comprise various information resources suitable for network access, such as web pages stored by a web server and accessible through the Internet and World Wide Web and a web browser. The media content may include managed content and unmanaged content. The managed content may comprise media content prepared and/or submitted by a website managing organization. The unmanaged content may comprise media content prepare and submitted by entities other than the website managing organization. For example, the unmanaged content may comprise media content that has been submitted by the content submitters 310-1-r. The content viewers 330-1-n view or consume the managed and unmanaged media content stored by the content data store 360.

In a typical implementation, an entity may interact with a website that includes content for viewing and/or downloading. The website may include content that is solely prepared by the managing organization, content that is submitted by one or more users, and content that is a mixture of the two. While it is relatively easy for the website managers to control content prepared by the managing organization, ensuring non-offensiveness of user submitted content may present a challenge. An example of such a website is the Office Templates website managed by Microsoft Corporation, Redmond, Wash. The website provides a forum for user of the MICROSOFT OFFICE® programs to interact, discuss features and issues, and exchange material such as templates. Allowing the users to submit their own templates enables exchange of a wealth of material enhancing user experience with the MICROSOFT OFFICE programs.

While most templates shared through the website are subject specific and technical in nature, some users may submit templates that may be found offensive by others. The difficulty in filtering offensive material lies not only in content evaluation of numerous templates that are submitted each day, but also in setting a bar for acceptance level. Content found offensive by some users may be quite acceptable and useful to others. To avoid over-filtering, the website may be set up at different "quality" levels. For each quality level, the amount and filtering of available material may be set differently. For example, a high quality level may present only managed content to the website viewers. A medium quality level may present a mixture of managed content and trusted user content. Finally, a low quality setting may allow access to all material at the website. Other gradations may also be implemented using the principles described herein. A default experience, which users encounter when they first visit the site, may be set to the medium quality level forcing users who desire access to all material to voluntarily change their quality setting.

In managing a website as described above, the next challenge is determining the trusted user content. Different filtering mechanisms may be applied to user submitted content for determining a trust level associated with the submitted content. As previously described, some embodiments are directed to methods of evaluating and assigning user trust levels for submitted content.

As shown in the illustrated embodiment shown in FIG. 3, a content filter 270 to receive the entity reputation score 212, compare the entity reputation score 212 with a defined reputation threshold score to find an entity result value, and filter media content based on the entity result value. By way of example, assume a content submitter 310-1 desires to submit media content to a digital online community hosted by the content management server 340. The content filter 270 may receive the request to store media content from the content submitter 310-1, and retrieve an entity identifier for the content submitter 310-1. The entity identifier may comprise any unique identifier for the content submitter 310-1, such as an email address, a network address, a login name, a screen name, a PUID, a media access control (MAC) address, and other contact information. The content filter 270 may retrieve an entity reputation score 212 corresponding to the entity identifier. The content filter 270 may retrieve the entity reputation score 212 on a real-time basis from the reputation subsystem 200 to receive the most current entity reputation score 212. The content filter 270 may also retrieve the entity reputation score 212 from a local data store, with the understanding that the entity reputation score 212 may not be current. The content filter 270 may compare the retrieved entity reputation score 212 with a defined threshold value to find an entity result value. The content filter 270 may use the entity result value to grant or deny permission to store media content submitted by the content submitter 310-1.

Additionally or alternatively, the content filter 270 may be implemented in a network accessible device other than the content management server 340. For example, the content filter 270 may be implemented as part of the reputation service node 110. This may ensure that the content filter 270 may have the most current entity reputation scores 212, and further, may be suitable for legacy devices that do not have the capability to implement the content filter 270. In this case, the content management server 340 may send a request for permission to allow the content submitter 310-1 to submit media content for the content data store 360, and the reputation service node 110 may return a response that grants or denies permission based on the entity reputation score 212 in response to the permission request.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 4 illustrates one embodiment of a logic flow 400. The logic flow 400 may be representative of some or all of the operations executed by one or more embodiments described herein.

In the illustrated embodiment shown in FIG. 4, the logic flow 400 may collect reputation information for an entity from a selected set of multiple reputation sources at block 402. For example, the data collection module 228-1 may send control directives to the data manager 244 to retrieve reputation information 208 from one or more reputation sources 260-1-$m$. The particular set of reputation sources 260-1-$m$ for a given implementation may be selected via the configuration information 206.

The logic flow 400 may extract a set of reputation features from the reputation information at block 404. For example, the feature manager module 228-2 may extract and index a set of reputation features from the reputation information 208. The particular type of reputation features extracted from the reputation information 208 may correspond to the reputation scoring algorithms implemented by the reputation scoring module 228-3.

The logic flow 400 may generate an entity reputation score based on the reputation features using a machine learning algorithm at block 406. For example, the reputation scoring module 228-3 may receive the reputation features from the feature manager module 228-2 and/or the storage component 230. The reputation scoring module 228-3 may use the reputation features to generate an entity reputation score 212 for an entity. The reputation scoring module 228-3 may use a supervised or unsupervised machine learning algorithm to increase the efficiency and effectiveness of reputation scoring operations. For supervised learning algorithms, labeled training data may be used to train the algorithm.

Figure 5:
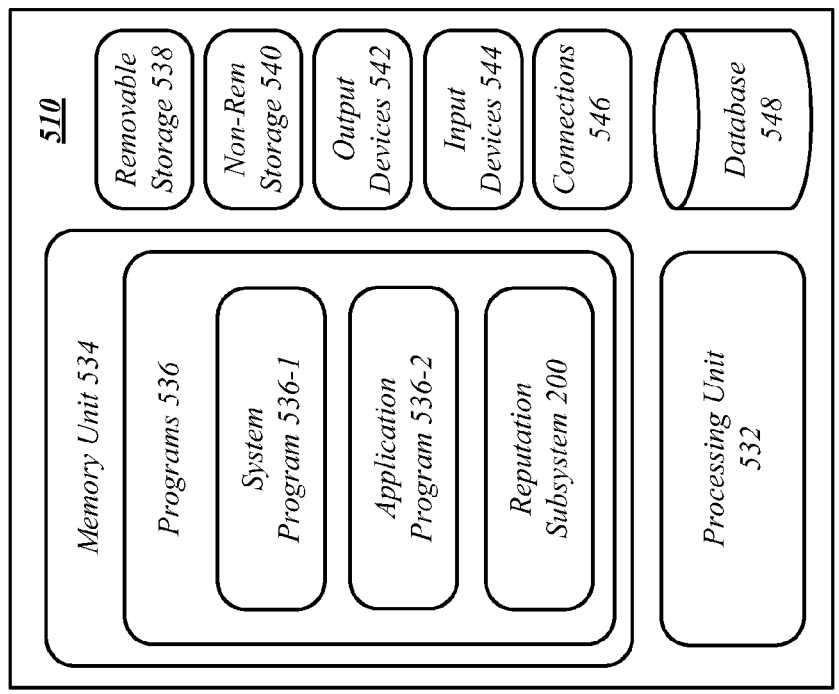
FIG. 5 illustrates an embodiment of a computing architecture.

FIG. 5 further illustrates a more detailed block diagram of computing architecture 510 suitable for implementing the reputation service node 110. In a basic configuration, computing architecture 510 typically includes at least one processing unit 532 and memory 534. Memory 534 may be implemented using any machine-readable or computer-readable media capable of storing data, including both volatile and non-volatile memory. For example, memory 534 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 5, memory 534 may store various software programs, such as one or more software programs 536-1-$t$ and accompanying data. Depending on the implementation, examples of software programs 536-1-$t$ may include a system program 536-1 (e.g., an operating system), an application program 536-2 (e.g., a web browser), the reputation subsystem 200, and so forth.

Computing architecture 510 may also have additional features and/or functionality beyond its basic configuration. For example, computing architecture 510 may include removable storage 538 and non-removable storage 540, which may also comprise various types of machine-readable or computer-readable media as previously described. Computing architecture 510 may also have one or more input devices 544 such as a keyboard, mouse, pen, voice input device, touch input device, measurement devices, sensors, and so forth. Computing architecture 510 may also include one or more output devices 542, such as displays, speakers, printers, and so forth.

Computing architecture 510 may further include one or more communications connections 546 that allow computing architecture 510 to communicate with other devices. Communications connections 546 may be representative of, for example, the communications interfaces for the communications components 116-1-$v$. Communications connections 546 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Figure 6:
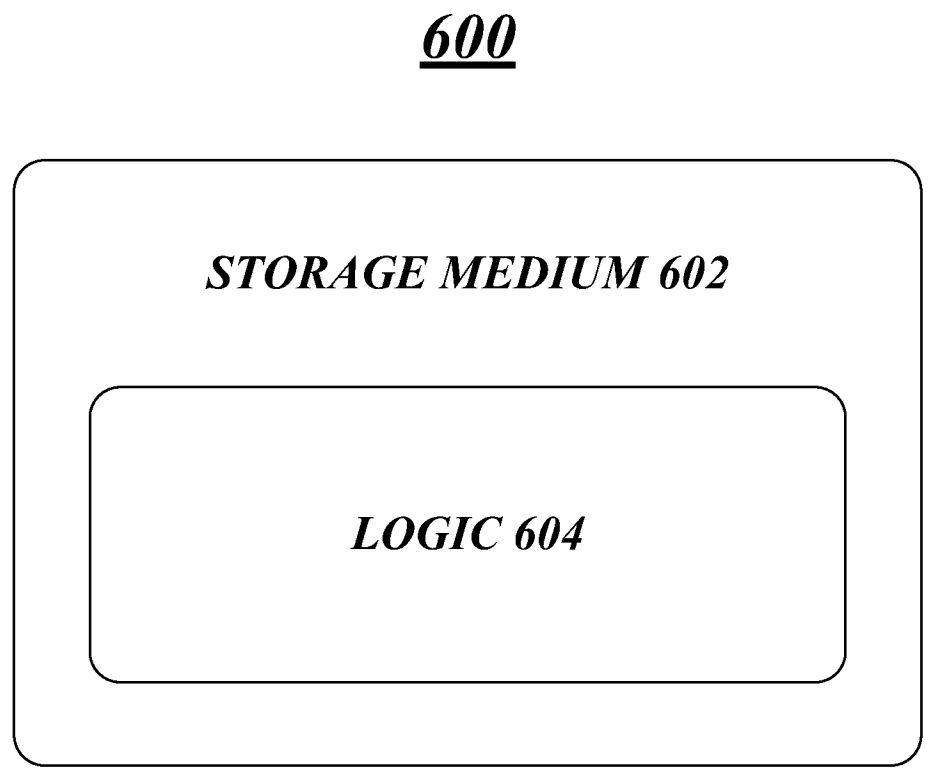

FIG. 6 illustrates a diagram an article of manufacture 600 suitable for storing logic for the various embodiments, including the logic flow 400. As shown, the article 600 may comprise a storage medium 602 to store logic 604. Examples of the storage medium 602 may include one or more types of computer-readable storage media capable of storing electronic data, including volatile memory or non-volatile memory, removable or non-removable memory, erasable or non-erasable memory, writeable or re-writeable memory, and so forth. Examples of the logic 604 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article 600 and/or the computer-readable storage medium 602 may store logic 604 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
    collecting reputation information for an entity from a selected set of multiple reputation sources;
    extracting a set of reputation features from the reputation information, the reputation features representing at least one of an encounter or a transaction between entity members of a digital online community;
    creating and persistently storing indexed reputation features from the reputation information; and
    generating an entity reputation score based on a probability estimate based on past community ratings of previous transactions or encounters.

2. The method of claim 1, wherein the probability estimate represents an estimate for the probability of whether an entity's next encounter or transaction will receive a positive rating from another entity.

3. The method of claim 2, comprising:
    fixing a set of entities in the digital online community from which to determine reputation, including at least a first entity and a second entity;
    initializing a set of relations between ordered pairs of entities from the set of entities;
    representing the set of entities and the set of relations as a directed graph having the entities as nodes and the relations as directed edges, wherein a directed relation describes an encounter or transaction between two entities;
    determining a reputation for the first entity as a conditional probability that the second entity having an encounter with the first entity will report a positive rating;
    using the community reputation information to generate an entity reputation score from the determined reputations; and
    performing activity scoring based on keeping track of events and performing accounting and rollup operations to generate the final entity reputation score.

4. The method of claim 1, comprising receiving a request for the entity reputation score from a content server for use in determining whether to allow the entity to submit media content to the content server.

5. The method of claim 1, comprising sending the entity reputation score to a content server for use in filtering media content submitted by the entity.

6. The method of claim 1, comprising filtering media content submitted by the entity based on the entity reputation score.

7. An apparatus, comprising:
a processing unit;
a reputation subsystem executing on the processing unit operative to manage an entity reputation score for an entity, the reputation subsystem comprising a reputation manager component and a reputation input/output component, the reputation manager component comprising:
a data collection module executing on the processing unit operative to collect reputation information for an entity from a selected set of multiple reputation sources;
a feature manager module executing on the processing unit and communicatively coupled to the data collection module, the feature manager module operative to extract a set of reputation features from the reputation information, the reputation features representing at least one of an encounter or a transaction between entity members of a digital online community, and to create and persistently store indexed reputation features from the reputation information; and
a reputation scoring module executing on the processing unit and communicatively coupled to the feature manager module, the reputation scoring module operative to generate an entity reputation score based on a probability estimate based on past community ratings of previous transactions or encounters.

8. The apparatus of claim 7, wherein the probability estimate represents an estimate for the probability of whether an entity's next encounter or transaction will receive a positive rating from another entity.

9. The apparatus of claim 8, the reputation scoring module to:
fix a set of entities in the digital online community from which to determine reputation, including at least a first entity and a second entity;
initialize a set of relations between ordered pairs of entities from the set of entities;
represent the set of entities and the set of relations as a directed graph having the entities as nodes and the relations as directed edges, wherein a directed relation describes an encounter between two entities;
determine a reputation for the first entity as a conditional probability that the second entity having an encounter with the first entity will report a positive rating;
use the community reputation information to generate an entity reputation score from the determined reputations; and
perform activity scoring based on keeping track of events and performing accounting and rollup operations to generate the final entity reputation score.

10. The apparatus of claim 7, the reputation input/output component to receive a request for the entity reputation score from a content server for use in determining whether to allow the entity to submit media content to the content server.

11. The apparatus of claim 7, the reputation input/output component to send the entity reputation score to a content server for use in filtering media content submitted by the entity.

12. The apparatus of claim 7, comprising a content filter to receive the entity reputation score, compare the entity reputation score with a defined reputation threshold score to find an entity result value, and filter media content based on the entity result value.

13. An article comprising a non-transitory storage medium containing instructions that when executed cause a system to:
collect reputation information for an entity from a selected set of multiple reputation sources;
extract a set of reputation features from the reputation information, the reputation features representing at least one of an encounter or a transaction between entity members of a digital online community;
create and persistently store indexed reputation features from the reputation information; and
generate an entity reputation score based on a probability estimate that is based on past community ratings of previous transactions or encounters.

14. The article of claim 13, wherein the probability estimate represents an estimate for the probability of whether an entity's next encounter or transaction will receive a positive rating from another entity.

15. The article of claim 14, further comprising instructions that when executed cause the system to:
fix a set of entities in the digital online community from which to determine reputation, including at least a first entity and a second entity;
initialize a set of relations between ordered pairs of entities from the set of entities;
represent the set of entities and the set of relations as a directed graph having the entities as nodes and the relations as directed edges, wherein a directed relation describes an encounter between two entities;
determine a reputation for the first entity as a conditional probability that the second entity having an encounter with the first entity will report a positive rating;
use the community reputation information to generate an entity reputation score from the determined reputations; and
perform activity scoring based on keeping track of events and performing accounting and rollup operations to generate the final entity reputation score.

16. The article of claim 13, further comprising instructions that when executed cause the system to receive a request for the entity reputation score from a content server for use in determining whether to allow the entity to submit media content to the content server.

17. The article of claim 13, further comprising instructions that when executed cause the system to send the entity reputation score to a content server for use in filtering media content submitted by the entity.

18. The article of claim 13, further comprising instructions that when executed cause the system to filter media content submitted by the entity based on the entity reputation score.

* * * * *